United States Patent [19]

Coulis

[11] Patent Number: 5,759,660

[45] Date of Patent: Jun. 2, 1998

[54] PLASTIC COVERED ARTICLES FOR RAILINGS AND A METHOD OF MAKING THE SAME

[75] Inventor: Mark L. Coulis, Brunswick, Ohio

[73] Assignee: Associated Materials, Inc., Akron, Ohio

[21] Appl. No.: 540,664

[22] Filed: Oct. 11, 1995

[51] Int. Cl.⁶ .................................................. B32B 9/00
[52] U.S. Cl. .......................... 428/76; 428/34.9; 428/35.1; 428/36.3; 428/74; 428/218; 428/338; 264/146; 264/209.5; 156/86; 52/170; 52/731
[58] Field of Search ........................... 428/76, 99, 68, 428/33, 37, 74, 218, 338, 36.3, 34.9, 35.1, 170; 264/146, 209.5, 230; 52/731, 170, 727; 156/86

[56] References Cited

U.S. PATENT DOCUMENTS

| | | |
|---|---|---|
| 3,249,671 | 5/1966 | Perrone et al. . |
| 3,448,585 | 6/1969 | Vogelsang ........................ 61/54 |
| 3,861,944 | 1/1975 | Steinberg et al. . |
| 3,929,536 | 12/1975 | Maughan ........................ 156/85 |
| 3,949,110 | 4/1976 | Nakajima et al. . |
| 4,035,978 | 7/1977 | Bajorek et al. . |
| 4,104,394 | 8/1978 | Okita . |
| 4,109,912 | 8/1978 | Zentmyer . |
| 4,602,765 | 7/1986 | Loper et al. ........................ 256/19 |
| 4,624,874 | 11/1986 | Schutze ........................ 428/36 |
| 4,799,340 | 1/1989 | Lichau et al. . |
| 4,911,772 | 3/1990 | Hoffmann . |
| 4,980,214 | 12/1990 | Charriere . |
| 5,009,730 | 4/1991 | Tozier . |
| 5,053,174 | 10/1991 | Borg . |
| 5,138,806 | 8/1992 | Marx et al. ........................ 52/170 |
| 5,245,813 | 9/1993 | Brotz ........................ 52/727 |
| 5,402,988 | 4/1995 | Eisele . |
| 5,437,071 | 8/1995 | Feigenbaum . |
| 5,458,942 | 10/1995 | Miller . |

*Primary Examiner*—Patrick Ryan
*Assistant Examiner*—Abraham Bahta
*Attorney, Agent, or Firm*—Banner & Witcoff, Ltd.

[57] ABSTRACT

A plastic covered article for a railing which includes an elongate core encased in a seamless, plastic casing. The casing is heat shrunk to conform with the exterior surface of the core. The core is thereby covered along its length with a weather-resistant casing which requires no periodic field maintenance.

The railing articles of the present invention are fabricated by heating a tube of plastic material and causing the tube to expand. The elongate core is inserted into the expanded tube to encapsulate the core. The tube encapsulating the core is again heated to shrink the tube tightly against the core such that the tube conforms to the exterior surface of the core.

38 Claims, 2 Drawing Sheets

PLASTIC COVERED ARTICLES FOR RAILINGS AND A METHOD OF MAKING THE SAME

FIELD OF THE INVENTION

The present invention pertains to plastic covered articles, such as spindles and rails, for use in railings, and a method by which such articles are made.

BACKGROUND OF THE INVENTION

The spindles and rails used to fabricate outdoor railings are susceptible to deterioration, particularly if formed of wood. To minimize the effects of weathering, the products are coated with various types of finishes. For irregular and contoured components the finishes have been limited to paints, stains, or other liquid or spray coatings. As a result, periodic field maintenance is required to enhance the life and appearance of the components.

SUMMARY OF THE INVENTION

The present invention pertains to plastic covered articles, such as spindles and rails, for use in railings. The articles each comprise an elongate core which is covered with a seamless, plastic coating. The coating is heat shrunk to be tightly bound to the core and to conform with the exterior of the core even when formed with a contoured shape. The core is thereby covered along its length with a weather-resistant coating which requires no periodic field maintenance.

The articles of the present invention are fabricated by forming a plastic tube to be used as the coating. The tube is heated and expanded radially to receive a core member. The encased core is heated so that the plastic tube shrinks tightly against the core and conforms precisely to the core's exterior surface.

DETAILED DESCRIPTION OF THE PREFERRED EMBODIMENTS

Figure 1:
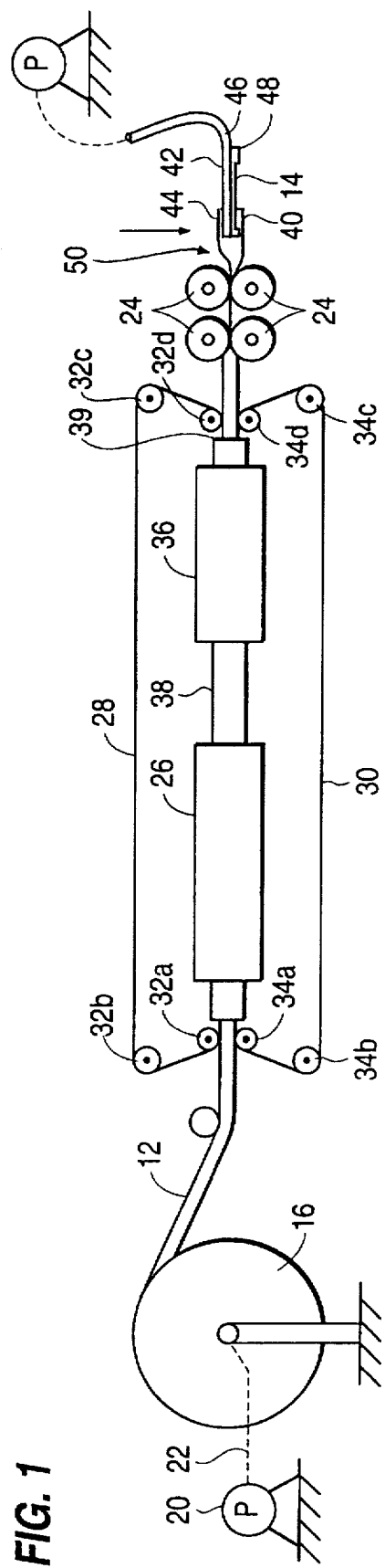
FIG. 1 is a schematic side view of a part of a production line for making an article in accordance with the present invention.

Articles 10 (FIGS. 3–5) of the present invention are adapted for use in railings. In this application, the term railings is used to generally refer to railings, balustrades, fences, and other barrier constructions. The articles fabricated in accordance with the present invention can be used as a vertical support (e.g., a spindle) or as a horizontal support (e.g., a rail). In general, article 10 comprises a core 14 and a plastic casing 15.

In accordance with the present invention, articles 10 are made by initially extruding a seamless plastic tube 12 by conventional means. The plastic is preferably a vinyl material, although other plastics could be used so long as they provide a weather-resistant coating and are useable in a heat shrink process. In a preferred embodiment, the material is composed of the following additives per hundred parts of PVC resin:

| Additive | Parts/Hundred |
| --- | --- |
| Linear Phalate Plasticizer | 23 |
| Titanium Dioxide | 12 |
| Paraffin Wax Based Processing Aid | 0.4 |
| Poly Butyl Acrylate | 1.3 |
| Cadmium/Zinc Based Heat Stabilizer | 0.8 |
| Tin Based UV Stabilizer | 0.5 |
| Calcium Stearate Lubricant | 0.5 |

Of course, different concentrations and/or the use of other components could also be used to practice the invention. In one preferred example, the tube is extruded with a 0.015 inch wall thickness and a one inch internal diameter. Of course, other sizes of tubes could be formed, depending on the size and shape of the core 14.

After extrusion, the tube is cooled in a tank (not shown) of cooling fluid (e.g., water) or by spraying (or other means) to a temperature of preferably about 56° F. The tube is thereafter coiled onto a spool 16 for easy storage and subsequent use. The tube is preferably stored on the spool for at least about 24 hours at room temperature (e.g., 68° F.) in order for the plastic to reach crystalline equilibrium. Other time frames and temperatures may be used as needed for other materials.

When the tube is coiled onto a spool 16, an upstream end of tube 12 is fed out the side of the spool along its center so that the end is available for connection to a pump 20 (FIG. 1). The upstream end of tube 12 is connected by a conventional coupling (not shown) to a conduit 22 of pump 20, such that the tube can rotate with the spool without binding. During the fabrication process, the tube is charged by pump 20 with pressurized air, preferably to an internal pressure of 30 pounds per square inch. A series of pinch rollers 24 are provided downstream in the process to maintain the tube under pressure.

The unexpanded plastic tubing 12 is fed into a heating jacket 26 by a pair of puller belts 28, 30. The belts are preferably endless bands composed of nylon; although other materials could be used. Each belt 28, 30 is wrapped about a series of four pulleys 32a–d, 34a–d. One of the pulleys 32c, 34c for each belt is driven by a motor (not shown). The drive pulleys 32c, 35c are preferably driven by the same motor to ensure even pulling on the tube. The belt lies against the sides of the tube along the entire distance the tube extends between pulleys 32a, 34a and 32d, 34d. The pressurized air within the tube provides a counter pressure against which the belts push. In the preferred embodiment, the belts move the tube downstream at a rate of about 10 feet per minute.

A battery of radiant heaters (not shown) are provided within heating jacket 26 to surround the tube; nevertheless other methods of heating (e.g., conduction heating) could also be used. In the preferred construction, the heating jacket is about 15 feet long and preferably heats the tube to about 212° F. The elevated temperature not only softens the tube material, but also increases the pressure within the tube so that the tube expands to about twice its original internal diameter. Accordingly, in the preferred embodiment, the tube expands to a diameter of about two inches. The engagement of belts 28, 30 against tube 12 acts to minimize the longitudinal stretching of the tube in the heating jacket. Belts 28, 30, however, are sufficiently pliable to permit the tube to expand radially to its desired size.

Following heating jacket 26, the expanded plastic tube is led through a conduit 38 into a cooling jacket 36. Conduit 38 is preferably a 2⅛ inch inner diameter copper tubing of about 18 inches in length. The cooling jacket is preferably about six feet long and supplied by conventional means with air chilled to a temperature of about 55° F. While belts 28, 30 in cooling jacket 36 press in on tube 12 as the air inside the tube is cooled, the tube is not subject to actual shrinkage of its size.

Pinch rollers 24 tightly pinch the tube closed at the exit port 38 of cooling jacket 36. At least one of the pinch rollers of each pair of rollers is driven by a motor (not shown) in order to advance the tube downstream. Pinch rollers 24 are designed to advance the tube at the same rate as belts 28, 30. As noted above, pinch rollers 24 minimize the loss of pressurized air from tube 12 upstream of the pinch rollers.

As the tube moves beyond pinch rollers 24, the downstream end 40 of tube 12 is fed over a pipe 42 and a core 14 at the same time. Pipe 42 has a nozzle 44 at its end which feeds pressurized air into tube 12. The pressurized air fills the tube and provides it with sufficient body so that the tube can be advanced by the pinch rollers along the entire length of core 14. The size of the tube at this location has been exaggerated in FIG. 1 to provide greater clarity of the operation. In the preferred construction, nozzle 44 is positioned slightly upstream of core 14, and is tapered on its forward end to facilitate easier feeding of the core into the tube. Pipe 42 and core 14 are supported at their downstream ends 46, 48 by conventional grippers (not shown).

Once core 14 is completely enveloped in a length of plastic tube 12, pipe 42 is removed and the plastic tube cut by a cutting blade 50 (or other known cutting means) adjacent the downstream side of pinch rollers 24. The cut length of the plastic tube forms a casing 15 which covers core 14. In the preferred construction, casing 15 overhangs core 14 by about an inch on each end. After the tube is cut, the assembled core 14 and casing 15 (i.e., an intermediate product) are placed on a table 51. The table laterally moves the intermediate product to a position where the intermediate product is picked up by a mechanical picker 52 of conventional design. The table then returns to its initial position underlying another core to be fed with pipe 42 into the next advancing length of tube 12.

Figure 2:
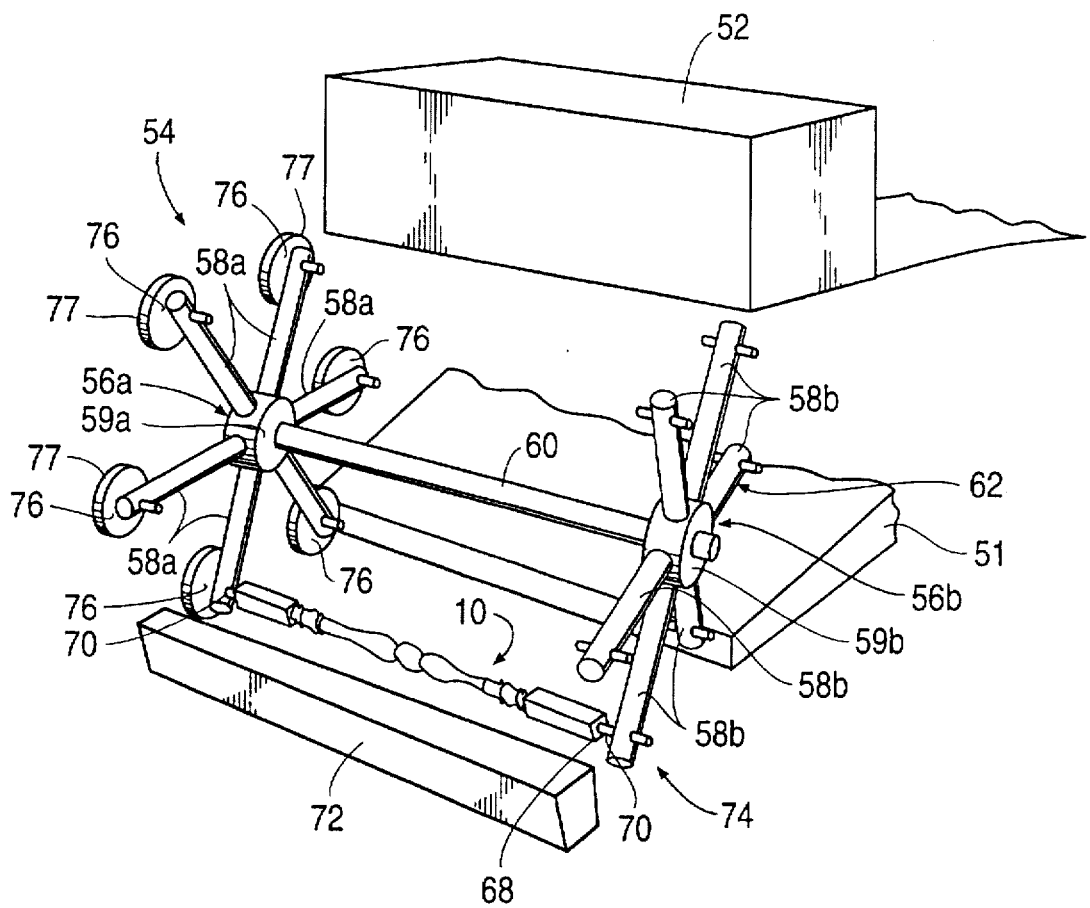
FIG. 2 is a schematic perspective view of another part of a production line for making an article in accordance with the present invention.

The mechanical picker 52 functions to mount the intermediate product onto a carousel 54 (FIG. 2). In the preferred construction, carousel 54 includes a pair of opposed mounting members 56a, 56b, each having six radially extending, equally spaced arms 58a, 58b; nevertheless, other constructions could be used. Arms 58a, 58b of each mounting member 56 are fixed to a common hub 59a, 59b. Hubs 59a, 59b are fixedly attached to a central shaft 60 which is rotatively driven by a motor (not shown) to incrementally move arms 58a, 58b to successive stations. The intermediate products are mounted to a pair of opposed arms 58a, 58b positioned at station 62 by picker 52. The intermediate product is held at its ends by grippers 68. In the preferred construction, grippers are spring loaded cup elements; nevertheless, other gripping assemblies could be used. Each cup element 68 is secured to a shaft 70 for free axial rotation.

The arms 58a, 58b are incrementally rotated about shaft 60 to position the intermediate product above a radiant heater 72 at station 74; although other heaters could be used. The intermediate product is rotated about its own longitudinal axis, preferably at a rate of about 20–22 R.P.M., to provide even heating to casing 15. To provide the desired rotation, a motor plate 76 is preferably attached to the outer end of each shaft 70 of one set of arms 58a. Motor plate 76 has a knurled peripheral edge 77 which engages a drive plate (not shown) at station 74. The drive plate is also preferably provided with a knurled edge to rotate intermediate product 10a at the desired rate. Of course, other driving arrangements could be used.

Figure 3:
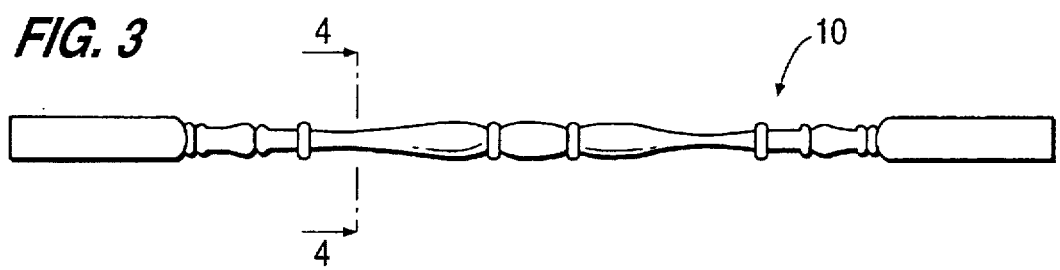
FIG. 3 is a side view of an article fabricated in accordance with the present invention.

In the preferred embodiment, heater 72 heats casing 15 to a temperature of about 212° F. for <one-half minute (e.g., 20 seconds) to cause the plastic casing to shrink and fit tightly against the exterior surface 78 of core 14. Specifically, the plastic casing shrinks to conform to the exterior surface of core 14, even when the core is formed with a highly contoured configuration (FIG. 3). Casing 15 provides a durable, weather-resistant coating without distortion of the materials. In the preferred construction, casing 15 of the final article 10 has a wall thickness of about 0.030 inches. Finally, railing articles 10 are removed from arms 58 at station 80 by mechanical picker 52 and loaded onto a conveyor for cooling, washing and packaging.

Figure 4:
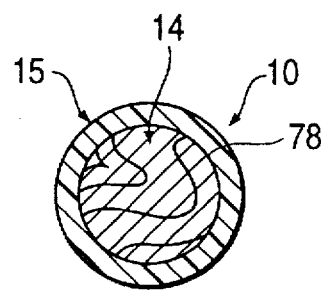
FIG. 4 is a cross-sectional view taken along line 4—4 in FIG. 3.
Figure 5:
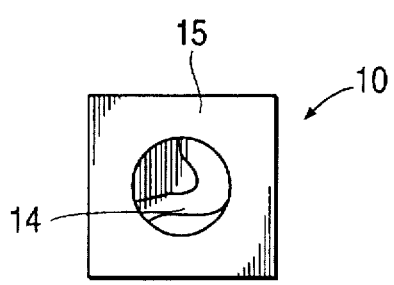
FIG. 5 is an end view of the article.

Article 10 includes an internal core 14 which is covered with a plastic casing 15 (FIGS. 3–5). The core is formed of a rigid material to provide the desired strength and shape to the article. For aesthetic purposes, core 14 is frequently formed with a contoured exterior surface which provides significant variations in the thickness of the core. The core is preferably formed of wood, but could be formed of other materials which are of a sufficient strength, capable of being formed into the desired shape, and able to withstand the elevated temperatures required for fabrication.

The casing 15 is tightly bound to core 14 to prevent undesired shifting or deformation of the casing. Moreover, the casing is tightly engaged against the core so that the casing assumes the same configuration as the exterior of the core. As discussed above, the casing of article 10 is a thin walled membrane (e.g., 0.030") which can readily cover a highly contoured core without unsightly deformation (the thickness of casing 15 has been exaggerated in FIG. 4). In this way, the article can be formed with virtually any configuration desired by the designer.

Further, casing 15 is a seamless sheath which covers the length of the core to provide a weather-resistant coating. The seamless nature of the casing lessens the risk of delamination or separation. Since weathering of the core is alleviated, there is no need for periodic field maintenance. Although the ends of the core remain uncovered, the ends are received within other components of the railing. For example, if articles 10 are as spindles, the ends are received in upper and lower horizontal support members (not shown) in a conventional manner to form a railing. The upper and lower support members then shelter the ends of the article and prevent weathering at the core's ends.

The above discussion concerns the preferred embodiments of the present invention. Various other embodiments as well as many changes and alterations amy be made without departing from the spirit and broader aspects of the invention as defined in the claims.

I claim:

1. An article for use in a railing comprising:
   an elongate, relatively rigid core having a pair of opposite ends and an exterior surface, said exterior surface having a longitudinal profile with significant variations in core thickness; and
   a tubular plastic, heat shrunk, seamless casing having an outer surface, said casing encapsulating said core such that said casing conforms to said exterior surface of said core in tight engagement therewith and said outer surface of said casing matches the profile of said exterior surface of said core, said casing extending along the entire length of said core and overlapping said ends of said core to form a weather-resistant coating for said core.

2. An article in accordance with claim 1, in which said casing is composed of a PVC resin.

3. An article in accordance with claim 1, in which said core is composed of wood.

4. An article in accordance with claim 1, in which said casing partially overlaps said ends such that only a portion of each said end of said core is exposed.

5. A process for making an article for a railing comprising heating a tube of plastic material, causing said heated tube to expand in substantially only a radial direction, inserting an elongate core having an exterior surface into said expanded tube to encapsulate said core, heating said tube with said encapsulated core to shrink said tube tightly against said core such that said tube conforms to the exterior of said core.

6. A process in accordance with claim 5, wherein said tube is formed by extruding.

7. A process in accordance with claim 5, wherein said tube is charged with pressurized air to cause said expansion of said heated tube.

8. A process in accordance with claim 7, in which said tube is engaged by members during said expansion of said tube, wherein said members permit radial expansion of the tube but which minimize longitudinal expansion of the tube.

9. A process in accordance with claim 7, in which driven belts engage said charged tube to transport said tube through a heating unit for said heating of said tube.

10. A process in accordance with claim 7, which further includes cooling of said expanded tube prior to inserting the core.

11. A process in accordance with claim 10, in which driven belts engage said charged tube to transport said tube successively through a heating unit and a cooling unit for said heating and said cooling of said tube, respectively.

12. A process in accordance with claim 5, which further includes cooling of said expanded tube prior to inserting the core.

13. A process in accordance with claim 5, wherein said heating of said tube with said encapsulated core includes axial spinning of the core with the tube near a heating source for even heating and shrinking of the tube about the core.

14. A process for making an article for a railing comprising providing an elongate plastic tube, feeding said tube along a course, heating said tube along a segment of said course, expanding said heated tube, inserting a substantially rigid core having an exterior surface into an open end of said expanded tube, cutting said tube to form a discrete length to encase said inserted core; heating said casing with said inserted core to heat shrink said casing tightly against the exterior surface of said core.

15. A process in accordance with claim 14, in which a plurality of cores are consecutively inserted into successive open ends of said tube.

16. A process in accordance with claim 14, in which said tube is extruded.

17. A process in accordance with claim 14, in which said expansion of the tube is caused by charging said tube with pressurized air.

18. A process in accordance with claim 17, in which an upstream end of said tube is coupled to a pump for said charging of the tube with pressurized air.

19. A process in accordance with claim 17, which further includes providing pinch rollers to pinch said tube after expansion of said tube to minimize the loss of said pressurized air from the tube upstream of the pinch rollers.

20. A process in accordance with claim 19, wherein said core is inserted into said tube concurrently with a conduit providing pressurized air to said tube downstream of said pinch rollers.

21. A process in accordance with claim 17, which further includes providing a plurality of belts to engage the exterior of said charged tube to feed said tube along a part of said course.

22. A process in accordance with claim 17, in which said tube is engaged by said belts during said expansion of said tube such that said tube expands radially but with only minimal longitudinal expansion of the tube.

23. A process in accordance with claim 14, in which said tube is stored for at least about 24 hours following said extrusion.

24. A process in accordance with claim 14, in which said tube is heated along a segment of the course by feeding said tube through a heating jacket.

25. A process in accordance with claim 14, further comprising cooling of said heated tube prior to insertion of the core into the open end of the tube.

26. A process in accordance with claim 25, in which said tube is cooled by feeding said tube through a cooling jacket.

27. A process in accordance with claim 14, further comprising axial spinning of the assembled core and length of discrete tube during heating thereof.

28. A process in accordance with claim 14, in which said expansion of said tube includes a significant amount of radial expansion, but only minimal longitudinal expansion.

29. A process for making an article for a railing comprising providing an elongate plastic tube, feeding the tube along a course, successively inserting individual cores each having an exterior surface into an open end of the tube, cutting the tube to form tube segments which encase the inserted cores, and heating said tube segments with the inserted cores to shrink the tube segments tightly against the exterior surfaces of the cores.

30. A process for making an article in accordance with claim 29 in which the tube is fed by a plurality of conveyor belts.

31. A process for making an article in accordance with claim 29 in which the tube is initially heated and expanded prior to said insertion of the core into the tube.

32. A process for making an article in accordance with claim 29 in which air is fed into the distal end of the tube to ensure that the distal end is sufficiently open to receive the core.

33. A process for making an article for a railing comprising providing a plastic tube, heating the tube, feeding compressed air into the heated tube so as to expand the tube, inserting a core within the expanded tube, and heating the tube to shrink the tube tightly against the exterior surface of the core.

34. A process for making an article in accordance with claim 33 in which the heated tube is cooled prior to said insertion of the core into the tube.

35. A process for making an article in accordance with claim 33 in which said expansion of said tube is nearly entirely in a radial direction.

36. A process for making an article for a railing comprising providing an elongate plastic tube, feeding said tube through a heating station with the use of a conveyor system, providing compressed air into the tube to radially expand the tube within the heating station, inserting a core into the tube, and cutting the tube into a discrete length to form a casing for the core, and heating the discrete length of tube to shrink the tube tightly against the core.

37. A process for making an article in accordance with claim 36 in which the conveyor system is used to feed the tube through a cooling station after the heating station.

38. A process for making an article in accordance with claim 36 in which the conveyor system includes a plurality of conveyor belts which limit the expansion of the heated tube to substantially only radial expansion while advancing the tube through the heating

* * * * *